United States Patent [19]

Schmidt et al.

[11] Patent Number: 5,108,602

[45] Date of Patent: Apr. 28, 1992

[54] STRAINING APPARATUS WITH A CONTINUOUS INWARDLY HELICAL OPEN CHANNEL

[75] Inventors: Gerhard Schmidt, Ettlingen; Heinrich Schmidt, Düsseldorf; Christian Neukam, Karlsruhe, all of Fed. Rep. of Germany

[73] Assignees: Hein, Lehmann Trenn- Und Fordertechnik GmbH, Dusseldorf; Isenmann Siebe GmbH, Karlsruhe, both of Fed. Rep. of Germany

[21] Appl. No.: 564,458

[22] Filed: Aug. 7, 1990

[30] Foreign Application Priority Data

Aug. 7, 1989 [DE] Fed. Rep. of Germany ....... 3926082

[51] Int. Cl.$^5$ .............................. B01D 33/27
[52] U.S. Cl. ..................... 210/304; 209/254; 209/264; 209/281; 209/362; 209/434; 210/414; 210/415; 210/512.1; 210/541
[58] Field of Search .................. 210/455, 493.4, 497.3, 210/499, 512.1, 456, 433.1, 414, 415, 541, 542, 358, 377, 304; 209/362, 254, 281, 264, 434, 269, 395, 405, 409, 508; 29/448

[56] References Cited

U.S. PATENT DOCUMENTS 2,760,504  8/1956  Spurlin ............................. 209/362
4,269,703  5/1981  Brüderlein .......................... 209/243
4,708,795  11/1987  Schmidt et al. ..................... 210/304
4,861,462  8/1989  Lehmann et al. ..................... 29/448

FOREIGN PATENT DOCUMENTS 0200096  5/1986  European Pat. Off. .
3515891  6/1986  Fed. Rep. of Germany .

Primary Examiner—Robert A. Dawson
Assistant Examiner—Sun Uk Kim
Attorney, Agent, or Firm—Herbert Dubno

[57] ABSTRACT

The invention relates to a straining apparatus for the separating of solid-liquid mixtures with a downwardly tapering straining basket, the basket inside wall of which has an inclination ($\alpha$) increasing from top to bottom, the charging of material to be strained being carried out approximately tangentially at the upper end of the straining basket and the material to be strained flowing downwards helically with radii becoming narrower, the straining basket wall forming at least one helical, inwardly open channel, which is bounded at top and bottom by helical side walls, between which the channel base having straining openings is arranged, the radius of which base decreases from top to bottom and which is inclined with respect to the vertical axis by the angle ($\alpha$) in such a way that, in feeding, the inclination is at first small and then increases constantly.

10 Claims, 1 Drawing Sheet

STRAINING APPARATUS WITH A CONTINUOUS INWARDLY HELICAL OPEN CHANNEL

FIELD OF THE INVENTION

The invention relates to a straining apparatus for the separating of solid-liquid mixtures, with a downwardly tapering straining basket, whose inside has an inclination increasing from top to bottom, the charging of material to be strained being carried out approximately tangentially at the upper end of the straining basket and the material to be strained flowing downward helically with constricting radii becoming narrower.

BACKGROUND OF THE INVENTION

In the practice of dressing and preparation, use is made of, inter alia, strainer bends and centrifugal strainers for the same purpose. In the case of the strainer bend, as a rule, the suspension flows over an overflow weir in a thin layer onto the strainer from a height of about 460 m. This height produces a charging velocity of about $v=3$ m/s. In the case of the centrifugal strainer, the suspension is charged via a nozzle at high velocity tangentially into a large, horizontal ring. The latter consists of a U-shaped, inwardly open channel, the rear of which is formed by the strainer lining, which runs spirally narrower. The substantially dewatered material subsequently reaches a conical straining basket for post-dewatering, DE-A 35 15 891.

At the high charging velocity ($v=7-8$ m/s) a considerable centrifugal force is generated, by which a segregation of the suspension takes place. Since the solid is generally heavier than the liquid, it accumulates on the outside of the straining area. After one revolution, virtually only the preliminarily cleaned liquid flows off downward, whereas the solid remains in circulation on the strainer. Fresh charging causes the layer of solid to become thicker and thicker. This has the effect of an increase in the flow resistance for the liquid phase through the strainer, i.e. a reduced dewatering efficiency, and of an increased wear of the straining elements.

OBJECT OF THE INVENTION

The object of the invention is to improve a straining apparatus of this type mentioned at the in such a way that, with a simple construction, high dewatering efficiency and optimum conduction of the mixture, the solid does not build up but is reliably discharged through the U-shaped, smooth channel.

SUMMARY OF THE INVENTION

This object is achieved according to the invention by providing the straining basket wall so that it forms at least one helical, inwardly open channel, which is bounded at top and bottom by helical side walls, between which the channel base having straining openings is arranged, the radius of which base decreases from top to bottom. At the top, the channel base is inclined outward slightly (angle $\alpha_1$ approximately 7°). The angle increases downwards at a constant rate to approximately $\alpha_2=40°$.

This ensures that the mixture is conducted in a precise and calculable manner, achieving not only a high straining efficiency but also a good discharge of the solid.

It is particularly simple in terms of design if the channel side walls are formed by a cross-sectionally approximately horizontal, continuously running helical band, in particular a sheet-metal strip. To reduce wear, the channel side walls are lined with a layer of plastic. In this case, the layer of plastic may also surround the front end edge of the band.

It is particularly advantageous if plastic straining elements are detachable fastened between the channel side walls as the channel base, so that they can be exchanged easily and quickly.

A secure hold is achieved with a simple design and exchangeability if the channel side walls, in particular the plastic covering of the channel side walls, have recesses and/or projections, into which projections and/or recesses of the plastic straining elements positively engage. In this case, it is proposed that the upper and lower borders of the plastic straining elements engage as projections in grooves of the channel side walls. For this purpose, the borders and grooves may also have a rounded-off, semicircular cross-section.

It is also of advantage if the strainer inside wall is virtually vertical in the feed area, if the mixture is charged through a tangential nozzle and if the straining basket can be set into oscillation or vibrations.

SUMMARY OF THE INVENTION

An exemplary embodiment of the invention is described in further detail below and represented in the drawing, in which.

SPECIFIC DESCRIPTION

Figure 1:
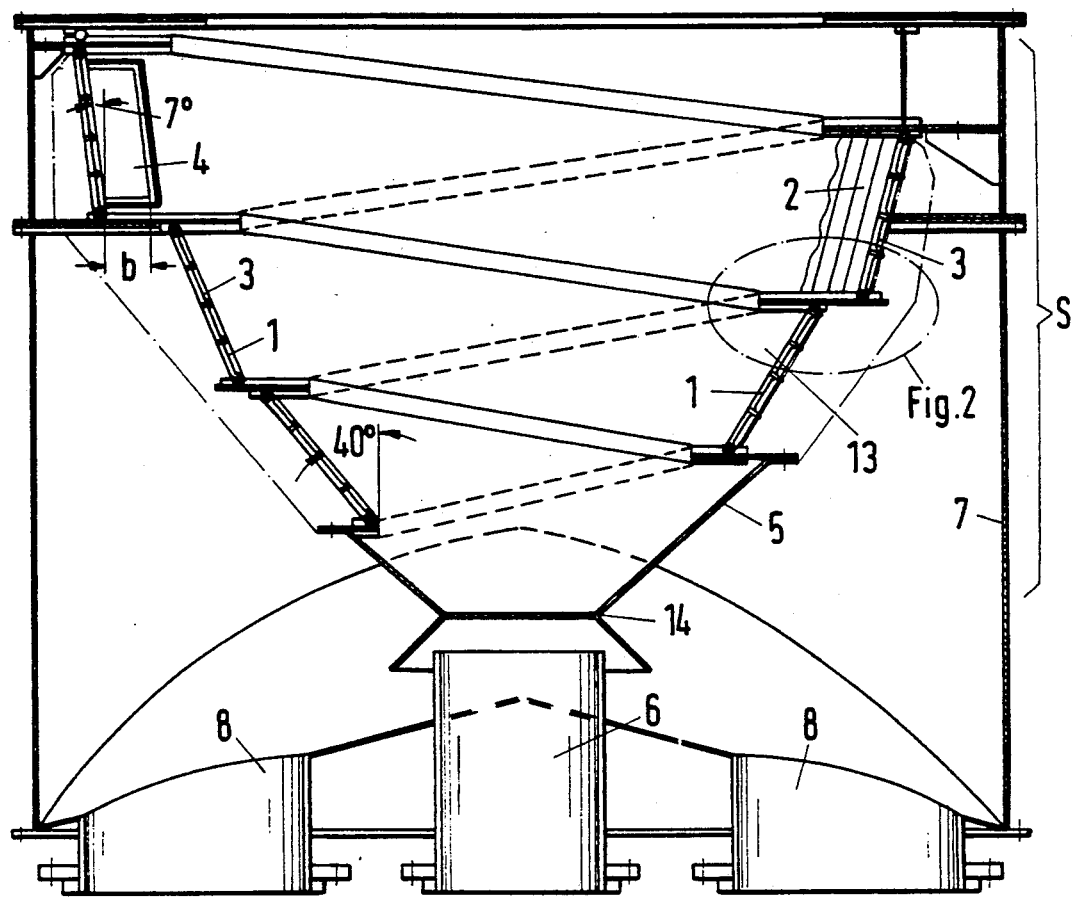
FIG. 1 is a vertical axial section through the straining apparatus.
Figure 2:
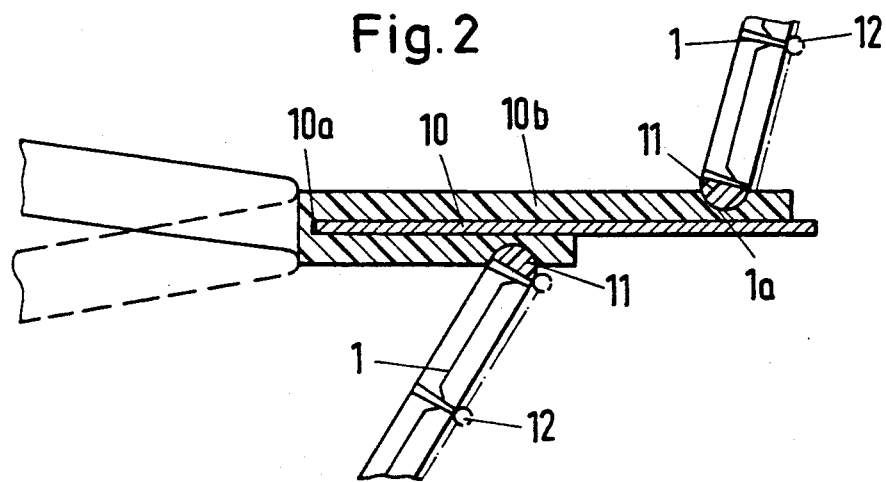
FIG. 2 is a detail of the region A of FIG. 1 on an enlarged scale.

The straining basket 2 extending over the height S has a cross-sectionally horizontal, continuously running helical band, in particular a sheet-metal strip 10, the inside edge 10a of which reduces in radius downwards. The sheet-metal strip 10, including its inner edge 10a, is lined on both sides by a layer of plastic 10b (FIG. 2). The layer 10b is fitted in U-shaped manner from inside onto the sheet-metal strip 10. In the layer 10b there are helical grooves 11 parallel to the edge 10a on the upper and lower sides of the sheet-metal strip 10. Plastic straining elements 1, detachably engage in these grooves 11 by their rounded-off upper and lower sides 1a (FIG. 2). The straining elements may have reinforcements and/or can rest on the outer supporting frame 12. Sheet-metal strip 10 and straining elements 1 thus form an approximately U-shaped helical channel 13 (FIG. 1), the radius of which reduces from top to bottom. The lowermost area of the strainer base of the channel 13 has the greatest inclination, and the uppermost area has the least inclination, so that the angle of inclination $\alpha$ of the channel base is at the greatest at the bottom and at the least at the top. At the lowermost area of the basket there is fastened a funnel 5, through which the solid is directed centrally to the discharge 6. The liquid flows into the housing 7, which surrounds the apparatus and has one or more outlets 8 at the lower end.

The straining surface 1 is supported at the rear by a series of bars 12, fastened in spiral form. The material to be strained or the solid-liquid mixture is introduced onto the straining surface 1 through a nozzle-shaped tangential charging device 4, which introduces the mixture tangentially at high velocity approximately horizontally where the straining surface 1 has the greatest radius. The mixture then flows along the downwardly spiralled area having the steepest screen walls as far as the strainer lining point of the area of small radius, then to pass there to the channel 13.

The basket may be fitted with conventional plastic straining elements, slotted bar strainers being preferred, the slots 3 of which may lie perpendicular or parallel to the generatrix of the walls in the upper area and run in circumferential direction in the lower area, to promote the dripping of the residual liquid out of the accumulating solid with the relatively low velocity there, so that then scarcely any liquid can pass to the discharge opening 14.

The velocity v is reduced progressively by the friction on the strainer. Liquid is constantly drawn off through the straining slots. The material which remains on the straining basket contains more and more solid; the viscosity and the friction on the strainer increase. At a constant angle of inclination and without the channel side walls 10, the stream of liquid would quickly pass steeply downwards to the solid discharge. The downwardly increasing angle of inclination $\alpha$ and the walls 10 counteract this, so that the majority of the liquid is separated by the straining slots and only the thickened solid slurry passes to the lower discharge opening. The residual dewatering is further promoted by the straining slots running transversely at the bottom.

As in the case of the known strainer bend, its is possible, by choice of the slot width 3 of the strainers, to determine the "near-mesh grain" of the solid, i.e. the size of the coarsest grain which is discharged with the liquid and the finest grain which still remains in the solid fraction.

The discharge and the post-dewatering of the solid can be further improved by high-frequency, axial oscillations of the complete conical basket or just its lower area. These oscillations can be generated by unbalance motors or a.c. solenoids.

The strainer with vertical axis consequently consists of an inwardly open U-shaped channel 13, which is taken conically-helically downwards, reducing in diameter, without any interruption. The channel is charged at the top by a tangentially arranged nozzle. In order to ensure an even layer distribution on the strainer, the strainer base is inclined to the vertical in the feed area, for example by the angle $\alpha_1 = 7°$, with respect to the vertical. The flow velocity is reduced more and more by friction. Therefore, the angle of inclination of initially $\alpha_1 = 7°$ is increased toward the outlet to $\alpha_2 = 40°$.

Here, at the angle 40°, the thickened solid can drip into the central funnel 5, while the water is collected by the outer housing 7 and carried away on the base. The strainer lining covering can consists of a flexible material, for example polyurethane, and has straining gaps 3, which are transverse to the direction of flow.

The nozzle is easily exchangeable. With the variable width b, the nozzle cross-section is adapted to the respective charging rate in such a way that the most favourable onflowing velocity of $v = 7-8$ m/s is achieved. The thickened solid is directed through the funnel 5 centrally into the solid discharge 6. The separated liquid is collected in the housing 7 and carried away on the base by one or two pipes 8.

We claim:

1. A straining apparatus for a solid/liquid mixture, comprising:
    a housing provided with at least one liquid outlet;
    a straining basket in said housing in a form of a continuous inwardly open channel having a plurality of turns spiralling downwardly and of downwardly decreasing radius, said channel being defined by channel sidewalls which are generally horizontal and a foraminous channel base formed with straining openings spanning said sidewalls over the length of said channels and along said turns, said channel base having an inclination to a vertical increasing from a relatively small inclination progressively over said turns from a top of said basket to a bottom thereof;
    means for directing said solid/liquid mixture tangentially onto said base at an upper end of said channel at which said base has said relatively small inclination and at a velocity inducing flow of said mixture along said channel and separation of solid from liquid of said mixture by passage of said liquid through said base over the length of said channel and a height of said basket, said solid flowing downwardly along said base; and
    means at the bottom of said basket for collecting solid separated from liquid of said mixture.

2. The straining apparatus defined in claim 1 wherein said sidewalls are formed by a continuous helical sheet metal strip having a cross section disposed substantially horizontal and extending over said plurality of turns.

3. The straining apparatus defined in claim 2 wherein said strip is lined with a layer of plastic.

4. The straining apparatus defined in claim 3 wherein said layer of plastic passes around an inner edge of said strip.

5. The straining apparatus defined in claim 1 wherein said base is formed from a multiplicity of plastic straining elements detachably affixed between said sidewalls.

6. The straining apparatus defined in claim 5 wherein said sidewalls are formed with grooves and said straining elements have projections engaged in said grooves.

7. The straining apparatus defined in claim 6 wherein said projections are upper and lower borders of said elements.

8. The straining apparatus defined in claim 7 wherein said borders and said grooves have substantially semicircular cross sections.

9. The straining apparatus defined in claim 1 wherein said means for directing is a tangential nozzle.

10. The straining apparatus defined in claim 1 further comprising means for oscillating said basket.

* * * * *